Nov. 14, 1944.  A. W. LEMMON ET AL  2,362,644
SELF-LUBRICATING BELT IDLER
Filed March 15, 1941   2 Sheets-Sheet 1
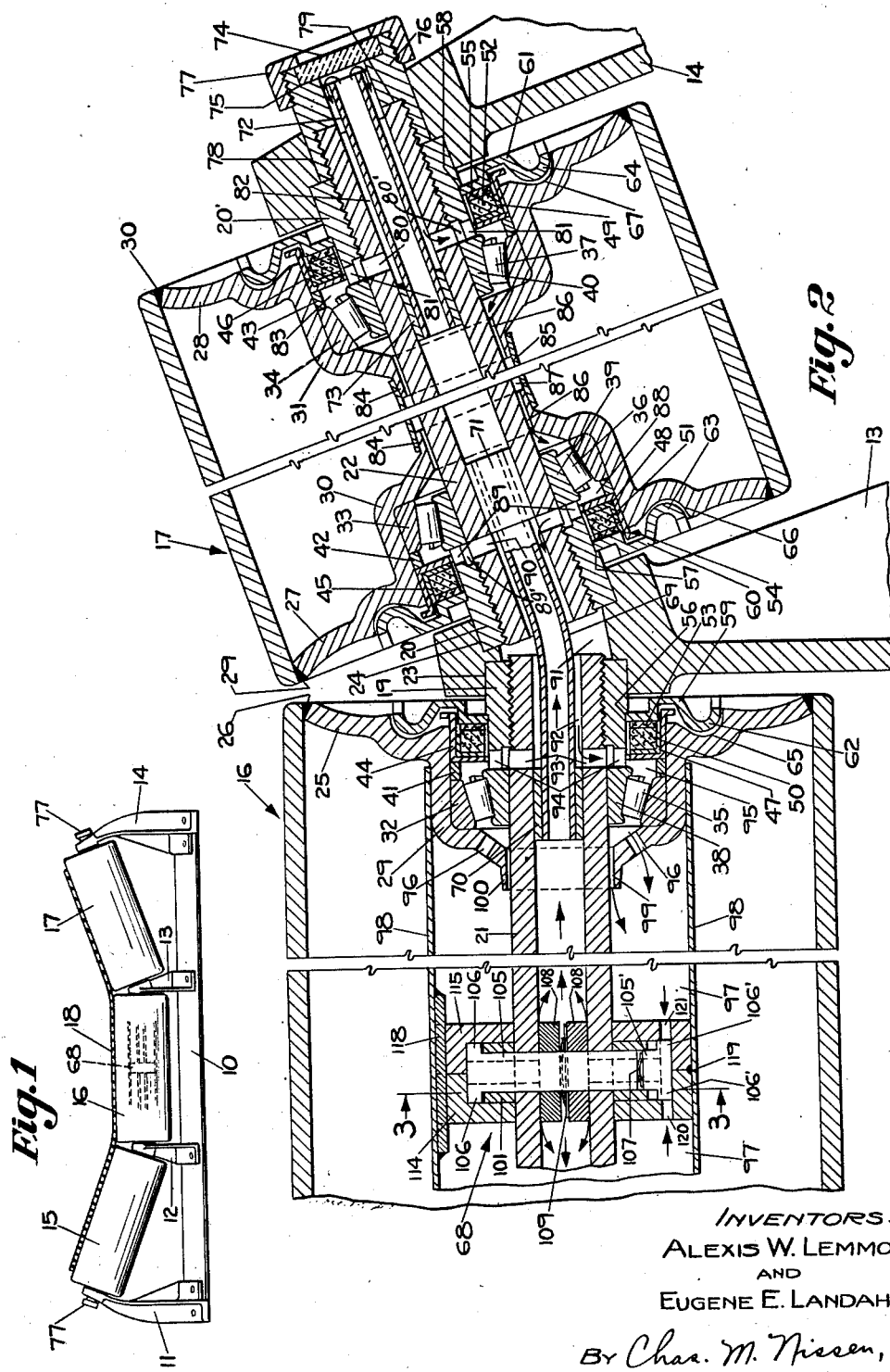
INVENTORS:
ALEXIS W. LEMMON,
AND
EUGENE E. LANDAHL,
By Chas. M. Nissen,
ATT'Y.

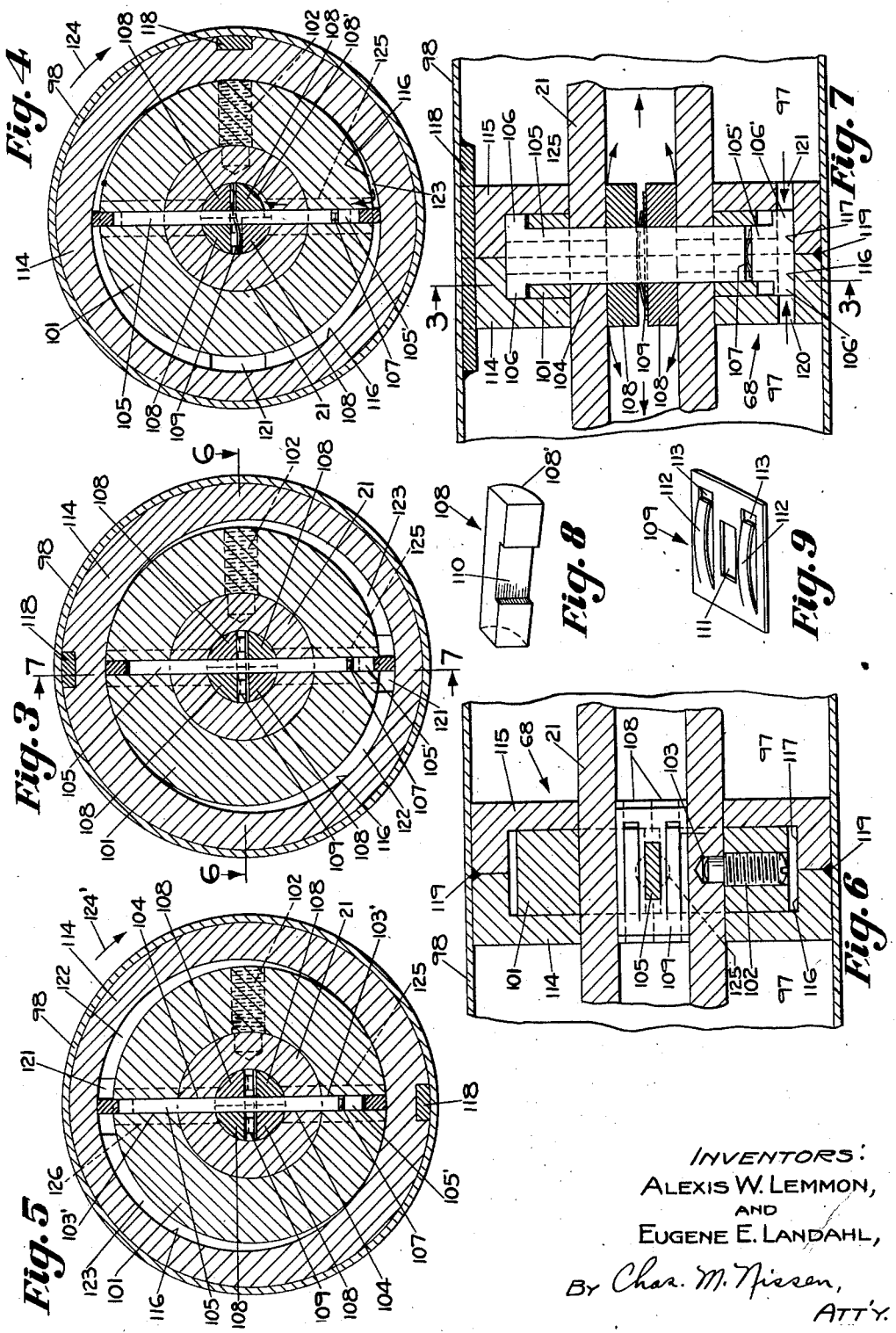

Patented Nov. 14, 1944

2,362,644

UNITED STATES PATENT OFFICE 2,362,644

SELF-LUBRICATING BELT IDLER

Alexis W. Lemmon, Columbus, Ohio, and Eugene E. Landahl, Detroit, Mich., assignors to The Jeffrey Manufacturing Company, a corporation of Ohio Application March 15, 1941, Serial No. 383,574

12 Claims. (Cl. 184—6)

Our invention relates to belt idlers and one of the objects of our invention is the provision of a self-contained, entirely enclosed, automatic circulating lubricating system, for such and like structures.

Another object of the invention is the provision of pumping mechanism enclosed within an idler and operated by the rotation thereof to circulate lubricant to and from the bearings of the idler without exposure to the atmosphere.

A further object of the invention is the provision of a self-contained circulating lubricating system for a set of troughing idlers comprising outer idlers inclined upwardly and embodying pumping mechanism in the central idler combined with passageways to effect circulation of the lubrication at such a low head that the return flow from the outer ends of the inclined idlers shall be by gravity.

Another object of our invention is the provision of pumping mechanism within an idler journaled on a hollow shaft and connected by lubricant seals to the shaft, combined with mechanism affording a circulation of the lubricant through the journal bearings at such a low pressure as to enable the seals to prevent leakage of the lubricant.

A further object of the invention is the provision of improved and efficient pumping mechanism particularly adapted for use in a self-contained belt-supporting idler to effect an enclosed circulation of the lubricant to and from the bearings of the idler.

Another object of the invention is the provision of a unique method of assembly of parts of pumping mechanism in and on a hollow shaft of a belt-supporting idler.

Other objects of the invention will appear hereinafter, the novel features and combinations being set forth in the claims hereto appended.

In the accompanying drawings,

Fig. 1 is a sectional elevation of a belt conveyor comprising a troughing idler, with a portion of our improved self-contained enclosed lubricant circulating system shown in dotted lines;

Fig. 2 is an enlarged sectional elevational view of a horizontal idler and an outer inclined idler embodying our improvements;

Fig. 3 is a sectional elevation taken on the line 3—3 of Fig. 7 or line 3—3 of Fig. 2, looking in the direction of the arrows;

Fig. 4 is a view similar to Fig. 3 but with the cam rotated ninety degrees from its position shown in Fig. 3;

Fig. 5 is a view similar to Fig. 3 but with the cam rotated 180° from its position in Fig. 3;

Fig. 6 is a sectional view taken on the line 6—6 of Fig. 3 looking in the direction of the arrows;

Fig. 7 is a sectional elevation taken on the line 7—7 of Fig. 3 looking in the direction of the arrows;

Fig. 8 is a perspective view of one of the valve elements located within the hollow shaft; and Fig. 9 is a perspective view of the resilient actuating device adapted to be used in association with the four valve elements one of which is shown in perspective in Fig. 8.

The mechanism which constitutes the support for the belt troughing idler shown in Fig. 1, comprises the base 10 to which are rigidly secured the spaced-apart upright standards 11, 12, 13 and 14, the upper ends of which are each provided with annular recesses for receiving the glands which are screw-threaded onto the ends of the hollow shafts on which the individual idlers are supported by means of anti-friction journal bearings.

As shown in Fig. 1 the belt troughing idler assembly comprises three idler units 15, 16 and 17 arranged end to end with the central idler unit 16 horizontal and the other units 15 and 17 inclined upwardly and outwardly in order to support the belt 18 in the shape of a trough.

The structure for supporting the idler 15 and for supporting the left-hand end of the idler 16 is the same as that shown in Fig. 2. The screw threaded glands 19 and 20 are threaded onto the outer ends of the hollow shafts 21 and 22 respectively. These glands have circular peripheries adapted to fit corresponding recesses 23 and 24 at opposite sides of the upper end of the standard 13.

The central horizontal idler unit 16 comprises an end plate 25 welded at its periphery to the end of the cylinder as indicated at 26 in Fig. 2. In a similar manner the end plates 27 and 28 are welded as indicated at 29 and 30 to the ends of the cylinder of the idler unit 17.

At their central portions, the end plates 25, 27 and 28 have cup-shaped inwardly extending recesses 29, 30 and 31 for receiving the outer races 32, 33 and 34 of anti-friction bearings comprising the rollers 35, 36 and 37, respectively. The inner races 38, 39 and 40 of these anti-friction bearings fit on the shafts 21 and 22, as shown in Fig. 2. The inner races may be held in their places by the screw-threaded glands 19, 20 and 20' bearing against the same as shown in Fig. 2.

Inserted in each of the cup-shaped recesses at the ends of idler units is a lubricant seal spaced from the roller bearings by means of the spacing rings 41, 42, 43. These lubricant seals comprise metal rings 44, 45, 46 which have a press fit into the cups 29, 30, 31 and surround reduced portions of the glands 19, 20, 20'. Press fitted into the rings 44, 45, 46, are metal rings 47, 48, 49. The interfitted metal rings are each L-shaped in cross-section. Vulcanized to the L-shaped rings 47, 48, 49 are rings 50, 51, 52, of rubber packing material which may also be vulcanized onto the cork rings 53, 54, 55.

The inner end portions of the glands 19, 20, 20' are reduced in diameter to form the annular shoulders 56, 57, 58, which are adapted to bear against the ring plates 59, 60, 61. The inner faces of these ring plates have a sliding fit against the outer faces of the cork rings 53, 54, 55. The ring plates 59, 60, 61 are curved inwardly at 62, 63, 64 to extend into the annular grooves 65, 66, 67 in the end plates 25, 27, 28.

It should be noted that the ring plates 59, 60, 61 are press fitted onto the glands 19, 20, 21 so as to remain stationary together with the shafts 21, 22 and the inner roller bearing races 38, 39, 40. The parts that rotate with cups 29, 30, 31 are the outer races 32, 33, 34, the spacing rings 41, 42, 43, and the lubricant seals including the rings 44, 45, 46, 47, 48, 49, the packing rings 50, 51, 52 and the cork rings 53, 54, 55. Since the grooves 65, 66, 67 rotate relatively to the plates 59, 60, 61, centrifugal force maintains such a current of air as to prevent ingress of dirt or dust to the lubricant seals. It should be particularly noted that the interior of each of idler units 15, 16, 17 is entirely cut off by the lubricant seals from the outside atmosphere.

At the center of the stationary shaft 21 of the central horizontal idler unit 16 is mounted a rotary pump 68 which is operated by rotation of the idler unit 16 to produce a circulation of oil to and through the various roller bearings as indicated by the arrows in Fig. 2. A bent tube 69 is connected at one end to the inner wall of the hollow shaft 21 by means of the bushing 70, and at the other end to the inner wall of the hollow shaft 22 by means of the bushing 71.

At the upper end of the shaft 22 the lower end of the tube 72 is connected by means of the bushing 73 with the inner wall of this hollow shaft. The upper open end of the tube 72 is spaced from the inner surface of a window 74 of transparent material such as glass. The window 74 may be circular, fitting into an annular recess 75 at the outer end of the tube 76. A ring 77 is screw-threaded onto the outer end of the tube 76 to clamp the window 74 in place with a leak proof fit. The tube 76 fits into a cylindrical bore 78 in the standard or pedestal 14 so as to be rotatable since the tube 76 is screw-threaded onto the upper and outer screw-threaded end of the shaft 22. An annular shoulder 79 of the tube 76 fits against the outer end of the shaft 22 and the inner end of the tube 76 fits against the outer end of the gland 20'.

From the foregoing it will be seen that when the pump 68 is operated by rotation of the central idler unit 16, oil is forced in opposite directions along the interior of the shaft 21 to the ends of the latter and thence upwardly and outwardly to the upper and outer open ends of the tubes 72 one of which is associated with the idler unit 17 and the other with the idler unit 15. The flow of the oil out of the upper open ends of the tubes 72 may be observed through the glass windows 74, one of which is associated with the idler unit 17 on the pedestal 14 and the other of which is associated with the idler unit 15 on the pedestal 11.

The pump 68 is so constructed and arranged, as more fully hereinafter explained, as to produce sufficient pressure to overcome the head due to the elevation of the upper open end of the tube 72, so that the oil will flow downwardly by gravity from the upper open end of the tube 72 as indicated by the arrows at the right-hand end of Fig. 2. A low-pressure pump is desirable so that the oil will not be forced past the various seals provided to enclose the lubricant circulating system.

To the right of the bushing 73 are diametrical radial openings 80, 80 in the shaft 22, in communication with annular grooves 80' with diametrical radial openings 81, 81 in the gland 20' so that oil may flow from the space 82 between the tube 72 and the inner wall of the shaft 22 to the roller bearing chamber 83.

Mounted on the hubs 84, 84 of the cups 30, 31, with pressed fits is a cylindrical member 85. After the oil flows through the roller bearing 37, it passes into the upper cylindrical space 86 between the upper hub 84 and the outer surface of the stationary shaft 22. The oil continues its flow by gravity through the cylindrical space 87 and thence through the lower cylindrical space 86 into the roller bearing chamber 88. It should be noted that the roller bearing chambers 83 and 88 are on the inner sides of L-shaped outer ring members 45, 46 of the lubricant seals.

Diametrical openings 89, 89 in the gland 20 are in communication through annular grooves 89' with the diametrical openings 90, 90 in the tubular shaft 22 and therefore, the roller bearing chamber 88 is in communication through such diametrical openings with the space between the tube 69 and the inner walls of the tubular shafts 21, 22. The oil may flow into the chamber 91 at the upper end of the pedestal 13 but since the oil is flowing through this chamber by gravity a liquid tight fit of the glands 19, 20 on their seats 23, 24 at the upper end of the pedestal 13 is sufficient to prevent leakage, particularly since the glands 19, 20 remain stationary during rotation of the idler units 15, 16, 17.

From the chamber 91 the oil flows through the cylindrical space 92 between the lower end portion of the tube 69 and the inner wall of the tubular shaft 21. Diametrical openings 93, 93 in the tubular shaft 21 at the right of the bushing 70 (Fig. 2) are in communication through annular grooves with diametrical openings 94, 94 in the gland 19. The cylindrical space 92 is therefore in communication through such diametrical openings with the roller bearing chamber 95 and the latter is in communication through the openings 96, 96 in the cup 29 with the oil reservoir 97 which is formed by press-fitting the ends of the cylindrical member 98 over the ends of the cups 29 of the end plates 25 of the central idler unit 16.

The various diametrical openings referred to are through stationary tubular shafts and glands screw-threaded thereon and while the arrows in Fig. 2 indicate the flow through the lower of such openings it should be understood that the upper openings may act as drainage ports for the excess oil carried to the tops of the roller bearings. To facilitate flow from the cup 29 into the reservoir 97 the cylindrical space 99 is provided between the hub 100 and the outer surface of the tubular shaft 21. It should be understood that the construction and arrangement for the left-hand end of the idler unit 16 is the same as shown in Fig. 2 and that the construction and arrangement for the interior of the idler unit 15 is the same as that shown in Fig. 2 for the idler unit 17. Consequently the flow of lubricant from the center of the pump 68 will be in opposite directions along the tubular shafts for the three idler units and the return flow of the oil will be by gravity in opposite directions from the outer ends of the outer idler units 15, 17 back to the reservoir 97.

The details of the rotary pump 68 are shown in Figs. 3 to 9, inclusive. Fig. 3 is a sectional view taken on the line 3—3 of Fig. 2 or Fig. 7 looking in the direction of the arrows and shows a cylindrical pump block 101 fitted on the outer surface of the tubular shaft 21. By means of a set screw 102 threaded radially through the pump block 101 into a cylindrical recess 103 in the tubular shaft 21, such pump block is secured to this shaft to prevent relative rotation. As shown in Fig. 6, when the set screw 102 is in retaining position its outer end is within the cylindrical peripheral surface of the pump block 101.

Extending through the pump block 101 are diametrical slots 103', 103' which register with diametrical slots 104, 104 in the tubular shaft 21. These slots are all of the same cross-sectional area as that of the pump vane 105 which is adapted to fit into such slots and have free sliding movement relatively to the shaft 21 as well as relatively to the pump block 101.

At one end the pump vane 105 is provided with laterally extending wings 106, 106 so that the pump vane portion which extends beyond the pump block as shown at the upper portion of Fig. 7 has a width, measured axially of the tubular enclosure 98, equal to the thickness of the pump block 101.

The other end of the pump vane 105 does not extend entirely through the pump block 101 but is provided with a T-shaped extension 105'. A spring 107 is interposed between the inner adjacent ends of the vane 105 and its extension 105'. Laterally extending wings 106', 106' are provided on the extension 105' as shown in Fig. 7. The winged outer end of the extension 105' has a width, measured axially of the tubular enclosure 98, equal to the thickness of the pump block 101. It should be understood that the pump block 101 is cylindrical and concentric with the tubular shaft 21 and that the pump vane 105 together with its extension 105' are slidable radially relatively to the shaft 21 and the pump block 101. The lateral wings 106, 106 and 106', 106' are adapted to move toward and from the cylindrical peripheral surface of the pump block 101. The spring 107 permits relative movement between the vane 105 and its extension 105' and therefore the entire vane unit 105, 105' is variable in length to a limited extent.

Before the pump vane 105 is inserted into the slots in the pump block 101 and in the tubular shaft 21, a valve element assembly is inserted into that portion of tubular shaft 21 adjacent the radial slots therein. Such valve element assembly includes four valve elements 108 each having the shape and configuration shown in Fig. 8 and each associated with the spring or resilient plate 109 shown in Fig. 9. Each valve element 108 has a rectangular notch 110 in one of its inner flat faces, adapted to fit over the vane 105. Each valve element 108 is approximately a quadrant of a cylinder with its outer curved surface 108' adapted to fit the inner cylindrical wall of the tubular shaft 21.

The spring or resilient plate 109 has slot 111 in the center thereof for receiving the vane 105. This plate has a width a little less than the diameter of the cylindrical passageway in the shaft 21, so as to be free to move up and down with the lower valve elements as seen in Fig. 7. Leaf springs 112, 112 are struck from the spring plate 109 so as to remain integral therewith and so as to have their free ends movable along the slots 113, 113 when flattened out in pumping operations. It should be particularly noted that all four valve elements 108 are duplicates of each other and therefore turnable end for end or invertible to bring the notch 110 of each over the vane 105 thereby enabling the latter to not only lock the plate 109 in position but also to interlock the valve elements against displacement except as required for pumping operations.

The pump block 101 and the winged ends of the pump vane 105, 105' are enclosed by the cam blocks 114, 115 each of which is provided with a central circular opening fitting over the cylindrical exterior of the tubular shaft 21. The cam blocks are slid onto opposite ends of the shaft 21 in opposite directions toward the pump block to enclose the latter when the adjacent faces of the cam blocks are brought together. The interiors of the cam blocks have eccentric cam surfaces 116, 117 which are complementary or flush with each other when the slots in the peripheries of the cam blocks 114, 115 are fitted over the key 118 which is welded to the inner wall of the cylindrical enclosure 98. The exterior peripheral surfaces are cylindrical and concentric with the enclosure 98 to fit the inner cylindrical wall of the latter. The key 118 and the slots in which they fit are parallel to the axis of rotation of the idler unit 16. The cam blocks 114, 115 are journaled on the stationary tubular shaft 21 and rotate together with the cylindrical enclosure 98. The contacting peripheral edges of the cam blocks 114, 115 are welded together at 119 before the cylindrical enclosure 98 is placed over the pump to insert the key 118 in the slots in the peripheries of the cam blocks 114, 115. It can readily be seen by referring to Figs. 6 and 7 that the combined width of the registering cam surfaces 116, 117 is equal to the width of the cylinder block 101 and equal to the width of each of the winged ends of vane sections 105, 105'. The outer ends of the vane sections 105, 105' are parallel to the axis of rotation of the pump and bear against the said cam surfaces 116, 117. The vane sections as shown in Figs. 2, 3, 4, 5 and 7 may remain in vertical positions, free to slide vertically to a limited extent relatively to the stationary pump block 101.

The cam blocks 114, 115 are provided with lateral inlet ports 120, 121 diametrically opposite the key 118, as shown in Fig. 7, and during each rotation of the cylindrical enclosure 98 these ports are submerged in the oil in the bottom of the oil reservoir 97. The pump chambers 122, 123 (Fig. 3) are then partially filled with oil. Assuming rotation of the cam blocks in the direction of the arrow 124 of Fig. 4 the oil in the pump chamber 123 will be confined by the vane extension 105' and as the cam surface 116 approaches the pump block 101 the oil will be forced up through the cylindrical, radial port 125 against one of the valve elements 108 to lift the same to open position as shown in Fig. 4. Oil will then flow under pressure in opposite directions along the interior of the tubular shaft as indicated by the arrows in Fig. 2. One such pumping action takes place during a half rotation of the cam blocks; that is from the position shown in Fig. 3 through the position shown in Fig. 4 to the position shown in Fig. 5.

Another pumping action takes place when the pump blocks are rotated in the direction of the arrow 124' of Fig. 5, the upper end of the vane section 105 then confining the oil in the pump chamber 123 and forcing the oil down the port 126 after the cam block port 121 moves to the right of the vane 105. The valve element 108 diagonally opposite to the one actuated in Fig. 4 will then be moved down and inwardly against the action of one of the leaf springs 112 to permit flow of oil into the tubular shaft 21. It may therefore be said that during each rotation of the cam block the pump has two forcing strokes.

It should be noted that the cylindrical ports 125 and 126 are each divided into two passageways by the vane 105, thus providing in all four passageways, one for each of the valve elements 108. This arrangement is for the purpose of enabling the pump to be operated upon reverse rotation of the idler unit 16. When the cam blocks are rotated in an anti-clockwise direction as viewed in Figs. 3, 4 and 5, the upper right-hand and lower left-hand valve elements will be operated successively or alternately. That is to say when the pump is rotated in one direction two diagonally opposite valve elements will be operated and when the pump is reversed the other two diagonally opposite valve elements will be operated.

It should also be noted that when the cam blocks are moved in the direction of the arrow 124' of Fig. 5, the inlet port 121 is open to the upper portion of the oil reservoir 97 which is less than half filled with a supply of oil but as the pump chamber 122, 123 moves clockwise as viewed in Fig. 5 it gradually increases in size and is still increasing in size as the port 121 is submerged in the oil. Consequently there is a suction action at the port 121 as the latter is being submerged until it reaches its position shown in Fig. 3. It may therefore be said that while the pump has two forced pumping strokes during each rotation of the cam blocks it has only one suction stroke during each such rotation.

Although we have described and shown our invention embodied in a belt idler assembly it should be understood that it may have a general application wherever rotating elements are journaled on bearings and in particular wherever rotating pulleys are employed.

Obviously those skilled in the art may make various changes in the details and arrangement of parts without departing from the spirit and scope of the invention as defined by the claims hereto appended and we therefore do not wish to be restricted to the precise construction herein disclosed.

Having thus described and shown an embodiment of our invention, what we desire to secure by Letters Patent of the United States is:

1. In a belt conveyor idler, the combination with supporting mechanism, of a series of shafts carried by said supporting mechanism in end to end relation, a plurality of pulleys one on each of said shafts, bearings interposed between each pulley and its respective shaft, a plurality of housings one encircling each shaft, means comprising a pump associated with one of said pulleys to force lubricant to all of said bearings, and conduit means including said housings to return the lubricant from all of said bearings to said pump.

2. In a belt conveyor idler, the combination with supporting mechanism, of three hollow shafts mounted on said supporting mechanism with the outer two inclined upwardly, three pulleys one for each shaft, bearings between each pulley and its shaft, lubricant seals closing the outer ends of the bearings, means to connect the center shaft with each of the outer inclined shafts to provide a combination of the passageways along said shafts, means comprising a pump associated with the center shaft and connected to said center pulley for operation by rotation thereof to force lubricant from said center pulley through said hollow shafts, and means forming conduits leading from said hollow shafts to each of said bearings and also providing a return passageway to said pump.

3. In a belt conveyor idler, the combination with supporting mechanism, of a plurality of shafts mounted thereon in end to end relation, the outermost shafts being inclined upwardly, a plurality of belt supporting pulleys one for each of said shafts, a pair of spaced bearings between each pulley and its shaft, lubricant seals for enclosing the said bearings, means operable by the rotation of one of said pulleys for pumping lubricant to said bearings, and mechanism affording passageways to direct the lubricant through all the bearings of all the pulleys in a self-contained circulating lubricating system for the pulleys of the conveyor idler.

4. In a belt conveyor idler, the combination with supporting mechanism, of a shaft mounted thereof, another shaft mounted on said supporting mechanism in end to end relation to said first named shaft, two pulleys one for each of said shafts, bearings between said pulleys and said shafts, means affording a closed endless passageway for circulating lubricant successively through bearings on both shafts, and means operable by rotation of one of said pulleys for pumping lubricant to said passageway.

5. In apparatus of the class described, the combination with a hollow bearing shaft, of a tubular member concentric with said shaft, relatively movable valve elements within said shaft, cam mechanism journaled on said shaft to rotate relatively thereto, means for connecting said cam mechanism to said tubular member to rotate with the latter, a cylindrical pump block secured to the exterior of said shaft and associated with said cam mechanism to afford pumping chambers, and a pumping vane extending diametrically through said shaft and diametrically through said pump block with its outer ends in engagement with a cylindrical surface in the cam mechanism eccentric to the cylindrical surface of the pump block, and a resilient device associated with the valve elements, said cam mechanism being provided with means for inflow of lubricant to passageways leading to said pumping chambers which in turn communicate through diametrical passageways in said pump block with said valve elements which are individually movable inwardly against the action of said resilient device when the lubricant is forced through the hollow shaft to bearings to be lubricated.

6. In apparatus of the class described, the combination with a hollow shaft, of a tubular member concentric with said shaft, an eccentric cam connected to said tubular element to rotate therewith, a cylindrical pump block secured to said shaft concentric therewith and associated with said eccentric cam to form pump chambers, a pumping vane extending diametrically through said pump block and said shaft and having its ends in sliding contact with said eccentric cam, valve elements within said hollow shaft associated with said vane in interlocking relation thereto but having limited movements relative to each other to open and closed positions relative to passageways extending diametrically through said pump block, and a resilient device for closing said valve elements automatically when no lubricant is being forced past the same from inlet means through said cam mechanism along the passageways in said pump block.

7. In apparatus of the class described, the combination with a supporting mechanism, of a pair of shafts supported thereon, a pulley on each shaft, bearing means between each pulley and its shaft, a pump within one of said pulleys, and lubrication passageways formed to provide a closed circuit to and from said pump and extending through said bearing means of both said pulleys, said lubrication passageways being formed in part by passageways through said shafts.

8. In apparatus of the class described, the combination with a supporting mechanism, of a pair of shafts supported thereon, a pulley on each shaft, bearing means between each pulley and its shaft, a pump, and lubrication passageways formed to provide a closed circuit to and from said pump and extending through said bearing means of both said pulleys, said lubrication passageways being formed in part by passageways through said shafts.

9. In apparatus of the class described, the combination with a supporting mechanism, of a pair of shafts supported thereon, a pulley on each shaft, bearing means between each pulley and its shaft, a pump within one of said pulleys, and lubrication passageways formed to provide a closed circuit to and from said pump and extending through said bearing means of both said pulleys.

10. In apparatus of the class described, the combination with a supporting mechanism, of a pair of shafts supported thereon, a pulley on each shaft, bearing means between each pulley and its shaft, a pump, and lubrication passageways formed to provide a closed circuit to and from said pump and extending through said bearing means of both said pulleys.

11. In apparatus of the class described, a pair of belt supporting pulleys, bearings for said pulleys, a pump contained within and operatively driven by one pulley when rotated, and conduits connecting said pump to lubricate the bearings of both pulleys.

12. In apparatus of the class described, a pair of belt supporting pulleys, bearings for said pulleys, a pump operatively driven by one pulley when rotated, and conduits connecting said pump to lubricate the bearings of both pulleys.

ALEXIS W. LEMMON.
EUGENE E. LANDAHL.